United States Patent [19]
LeBrun et al.

[11] Patent Number: 6,068,375
[45] Date of Patent: May 30, 2000

[54] EYEGLASS ASSEMBLY

[75] Inventors: Joseph Ronald LeBrun, South Windsor, Conn.; Martin P. Sauner, Chatelaine-Geneve, Switzerland

[73] Assignees: Lawrence Eyewear, Inc., South Windsor, Conn.; LN Industries SA, Chatelaine-Geneve, Switzerland

[21] Appl. No.: 09/127,293

[22] Filed: Jul. 31, 1998

[51] Int. Cl.⁷ .................................................. G02B 5/16
[52] U.S. Cl. .............................. 351/113; 351/111; 16/228
[58] Field of Search ................................... 351/111, 118, 351/119, 153, 140, 113; 16/228

[56] References Cited

U.S. PATENT DOCUMENTS

| | | | |
|---|---|---|---|
| 2,746,087 | 5/1956 | Dolezal | 351/111 |
| 2,976,766 | 3/1961 | Bianchi . | |
| 3,476,466 | 11/1969 | Hopkins . | |
| 3,549,246 | 12/1970 | Ruesch . | |
| 3,644,023 | 2/1972 | Villani . | |
| 4,222,148 | 9/1980 | Zellweger et al. | 351/113 |
| 4,448,502 | 5/1984 | Tota . | |
| 4,750,828 | 6/1988 | Sartor . | |
| 4,904,075 | 2/1990 | Blumenthal . | |
| 5,402,552 | 4/1995 | Chen . | |
| 5,515,575 | 5/1996 | Pinazza . | |

FOREIGN PATENT DOCUMENTS

| | | |
|---|---|---|
| 0 003 001 A1 | 7/1979 | European Pat. Off. . |
| 664 448 A5 | 2/1988 | Switzerland . |

*Primary Examiner*—Hung Xuan Dang
*Attorney, Agent, or Firm*—McCormick, Paulding & Huber LLP

[57] ABSTRACT

An eyeglass assembly is provided with a lens frame and a pair of earpieces each pivotally coupled to the lens frame by a hinge. A first hinge portion defines a first outwardly facing surface and an arm portion extending outwardly beyond the first outwardly facing surface. A second hinge portion is associated with the other of the lens frame and a respective earpiece, and includes an end portion defining a second outwardly facing surface. The end portion is coupled to the arm portion about a pivot axis extending through the arm portion and end portion. The first and second outwardly facing surfaces are contoured for frictionally and slidably engaging one another to permit pivoting of each earpiece relative to the lens frame within an arc of approximately 180° about the pivot axis from a folded position to a spread position where the free ends of the earpieces are substantially facing away from one another.

18 Claims, 3 Drawing Sheets

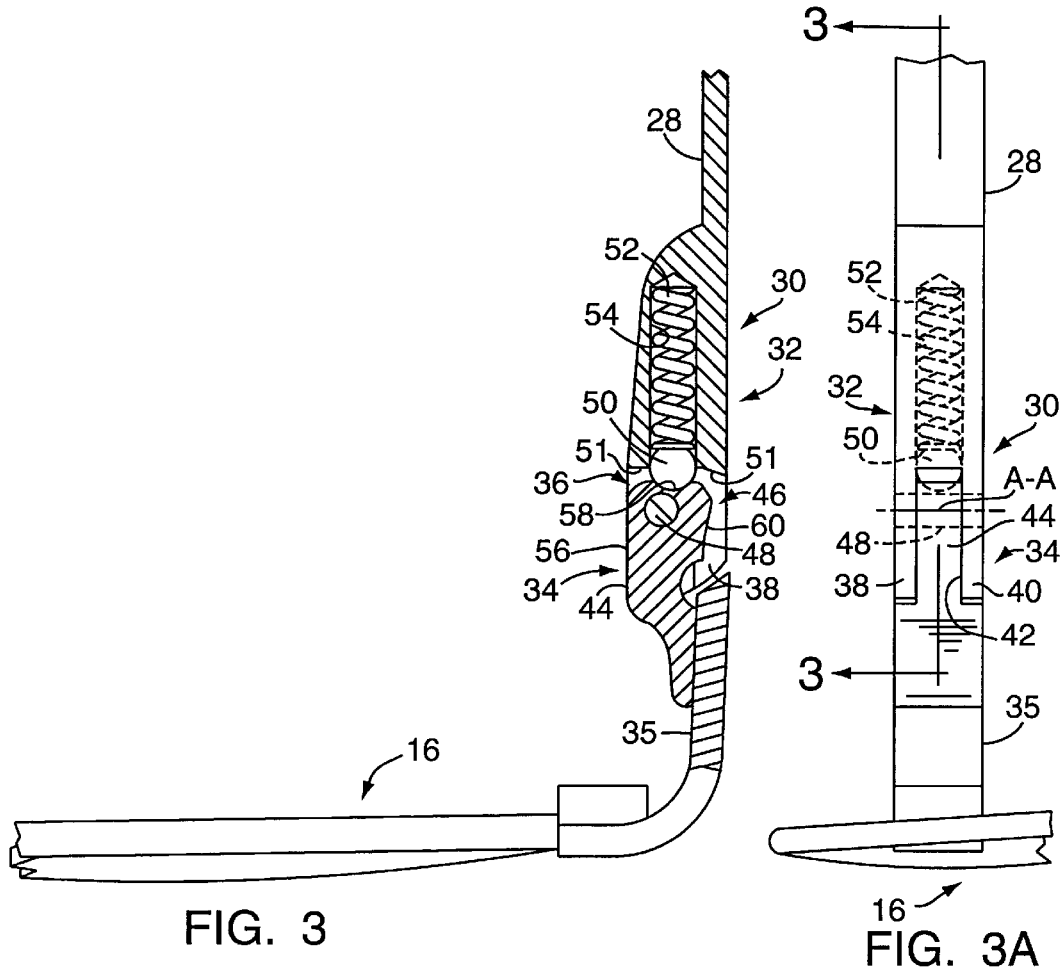
FIG. 3
FIG. 3A
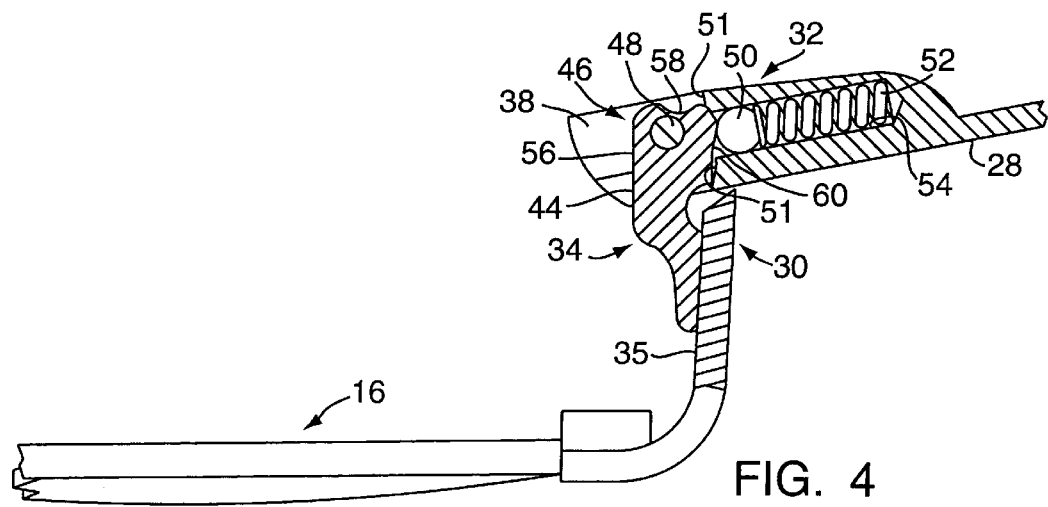
FIG. 4

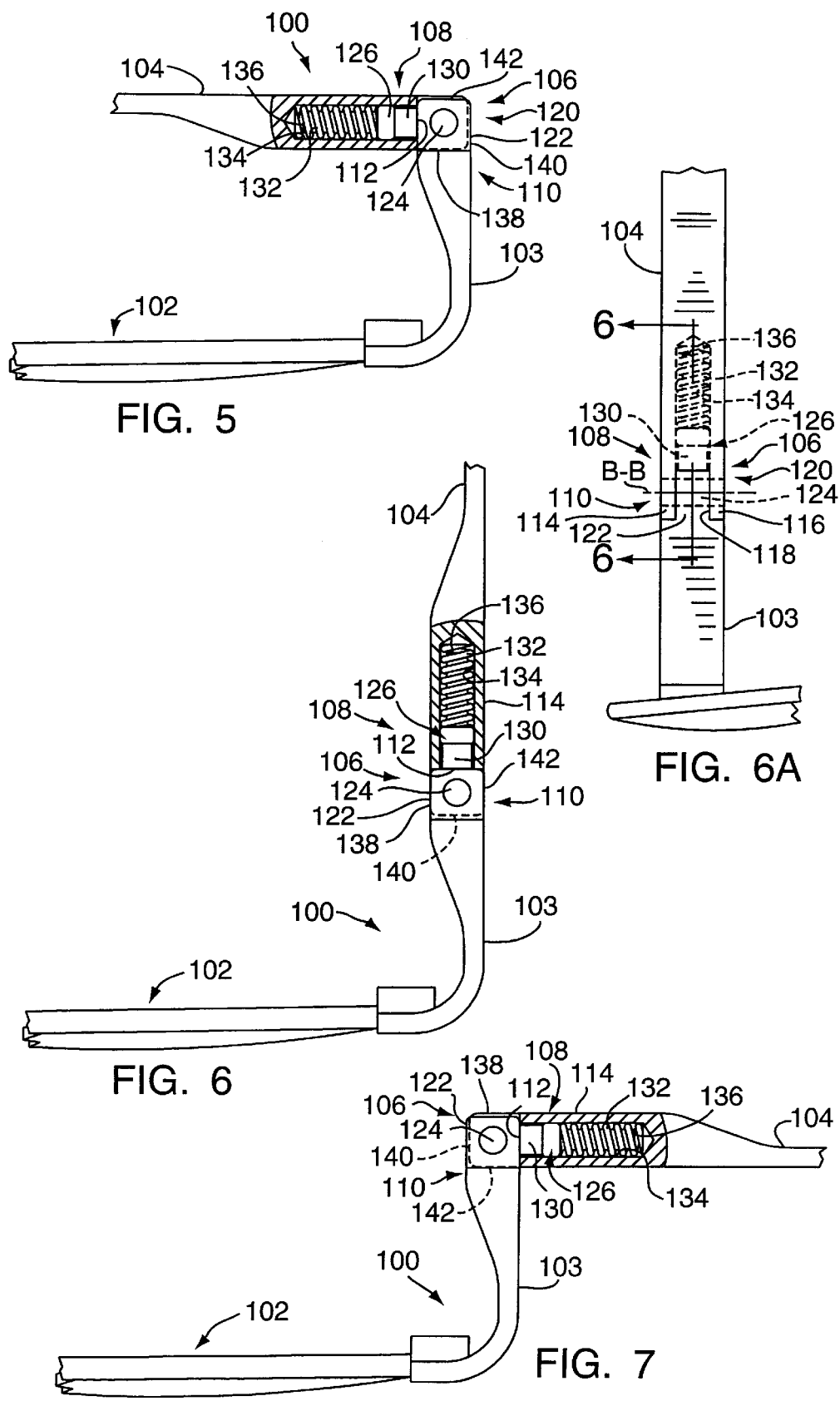

EYEGLASS ASSEMBLY

FIELD OF THE INVENTION

The present invention relates generally to a flexible eyeglass assembly, and more particularly to an eyeglass assembly including hinges which permit the earpieces to pivot relative to the lens frame within an arc of approximately 180° from a folded position to a spread position.

BACKGROUND OF THE INVENTION

Prior eyeglass assemblies have hinges connecting the earpieces to a lens frame which are adapted to pivot the earpieces relative to the lens frame within an arc of about a 90° from a folded position to an ear-engaging position. The construction of such hinges generally do not permit the earpieces to be pivoted substantially beyond the ear-engaging position without placing a dangerously high strain on the hinge components or flexing the earpieces beyond their breaking point. Strain to the eyeglass assembly is typically experienced in several common situations, such as when spreading the earpieces beyond the ear-engaging position when moving the eyeglass frame on and off a user's head, overextending the earpieces when worn on a head that is too wide for the eyeglass frame, or grabbing the earpiece by an infant. Such repeated strain to the hinge assembly will likely lead to weakening of and permanent damage to the hinge components and/or earpieces.

Some eyeglass frames include hinges which allow the earpieces to be overextended slightly beyond the ear-engaging position without placing undue strain on the eyeglass hinge assembly or earpieces. For example, U.S. Pat. No. 3,644,023 issued to Villani is directed to a spring-loaded spectacle hinge which allow the earpieces to be pivoted slightly beyond the usable or ear-engaging position. A planar stop surface 35 is provided on the earpiece to limit the further movement of the earpiece. One drawback of the prior art design is that the hinge assembly or earpiece can nevertheless be damaged if the earpiece is accidentally caused to be pivoted substantially beyond an angle where the stop surface comes into contact with the opposing surface of the eyeglass frame.

In response to the foregoing, it is an object of the present invention to provide a flexible eyeglass assembly that overcomes one or more of the above-described drawbacks and disadvantages of prior art eyeglass assemblies.

SUMMARY OF THE INVENTION

The present invention is directed to an eyeglass assembly comprising a lens frame and a pair of earpieces pivotally coupled to the lens frame. A pair of first hinge portions is provided, and each first hinge portion is associated with one of the lens frame and a respective earpiece. Each first hinge portion defines a first outwardly facing surface and an arm portion extending outwardly beyond the respective first outwardly facing surface. A pair of second hinge portions is provided, and each second hinge portion is associated with the other of the lens frame and a respective earpiece. Each second hinge portion includes an end portion defining a second outwardly facing surface. The end portion of the second hinge portion is coupled to the arm portion of the respective first hinge portion about a pivot axis extending through the arm portion and end portion. The first and second outwardly facing surfaces are contoured for frictionally and slidably engaging one another to permit pivoting of each earpiece relative to the lens frame within an arc of approximately 180° about the pivot axis from a folded position to a spread position where the free ends of the earpieces are substantially facing away from one another.

One advantage of the present invention is that the spread position provided by the eyeglass assembly prevents stress and damage to the eyeglass hinge, thus minimizing hinge damage and increasing the usable lifetime of the eyeglass assembly.

Another advantage of the present invention is that the spread position provided by the eyeglass assembly prevents damaging torque forces from being transferred from the eyeglass hinge to the earpieces when the earpieces are overextended substantially beyond the ear-engaging position. These dangerous torque forces can result in overflexing and permanently bending or breaking the earpieces, and typically occur, for example, when placing the eyeglasses on and off a user's head, wearing the eyeglasses on a head that is too large for the eyeglass frame, or when the earpieces are grabbed and overflexed, such as by a grabbing infant.

Other objects and advantages of the present invention will become apparent in view of the following detailed description and accompanying drawings.

BRIEF DESCRIPTION OF THE DRAWINGS

FIG. 3 is an enlarged, partial, cross-sectional view of the eyeglass assembly of FIG. 1 seen along the line 3—3 of FIG. 3A showing the right eyeglass hinge configured to place the respective earpiece in a middle or ear-engaging position.

FIG. 3A is an enlarged, partial side view of the eyeglass assembly of FIG. 1.

FIG. 4 is an enlarged, partial, cross-sectional view of the eyeglass assembly of FIG. 1 showing the right eyeglass hinge configured to place the respective earpiece in a spread position.

FIG. 5 is a partial cross-sectional, top plan view of an eyeglass hinge assembly configured to place the associated earpiece in a closed position, in accordance with a second embodiment of the present invention.

FIG. 6 is a partial cross-sectional, top plan view of the eyeglass hinge assembly of FIG. 5 seen along line 6—6 of FIG. 6A showing the eyeglass hinge configured to place the associated earpiece in a middle or ear-engaging position.

FIG. 6A is an enlarged, partial side view of the eyeglass hinge assembly of FIG. 6.

FIG. 7 is a partial cross-sectional, top plan view of the eyeglass hinge assembly of FIG. 5 configured to place the associated earpiece in a spread position.

DETAILED DESCRIPTION OF THE PREFERRED EMBODIMENTS

Figure 1:
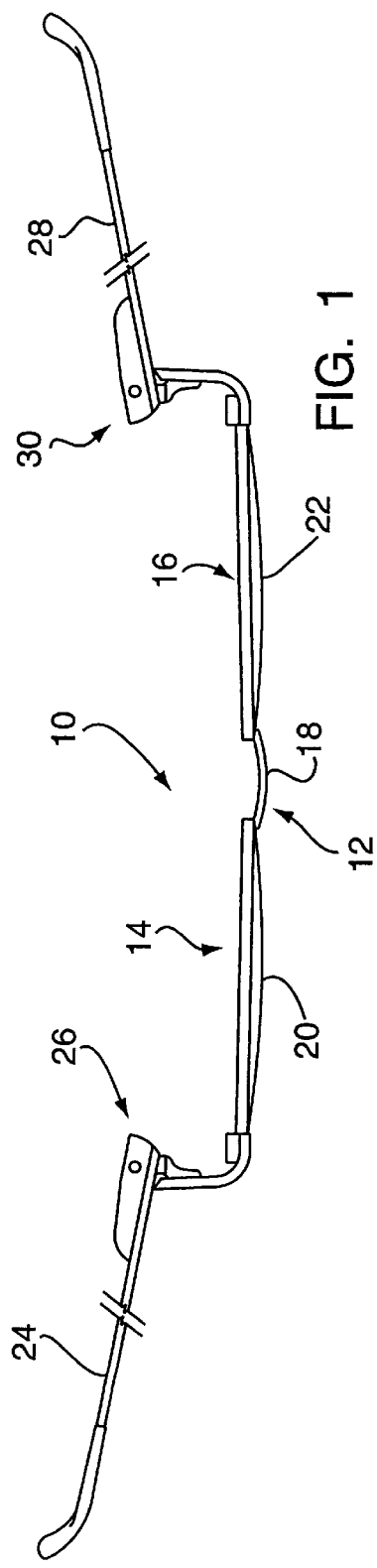
FIG. 1 is a top plan view of an eyeglass assembly embodying the present invention which illustrates eyeglass hinges configured to place the earpieces in a spread position.

Referring to FIGS. 1–4, an eyeglass assembly embodying the present invention is generally designated by the reference number 10. The eyeglass assembly 10 comprises a lens frame 12 having first and second frame portions 14, 16 coupled to one another by a nosepiece 18. The first and second frame portions 14, 16 support respective first and second eyeglass lenses 20, 22. A first earpiece 24 is pivotally coupled to the first portion 14 of the lens frame 12 via a first hinge 26. Similarly, a second earpiece 28 is pivotally coupled to the second portion 16 of the lens frame 12 via a second hinge 30.

As shown in FIG. 1, the first earpiece 24, the first hinge 26 and the first frame portion 14 comprise the right-hand side of the eyeglass assembly 10, and the second earpiece 28, the second hinge 30 and the second frame portion 16 comprise the left-hand side of the eyeglass assembly 10. Because the left and right-hand side of the eyeglass assembly 10 are mirror images of one another, the further description and operation of the eyeglass assembly will be explained more fully with reference to the left-hand side only, but is understood to cover the mirror image structure and operation of the right-hand side of the eyeglass assembly 10.

Figure 2:
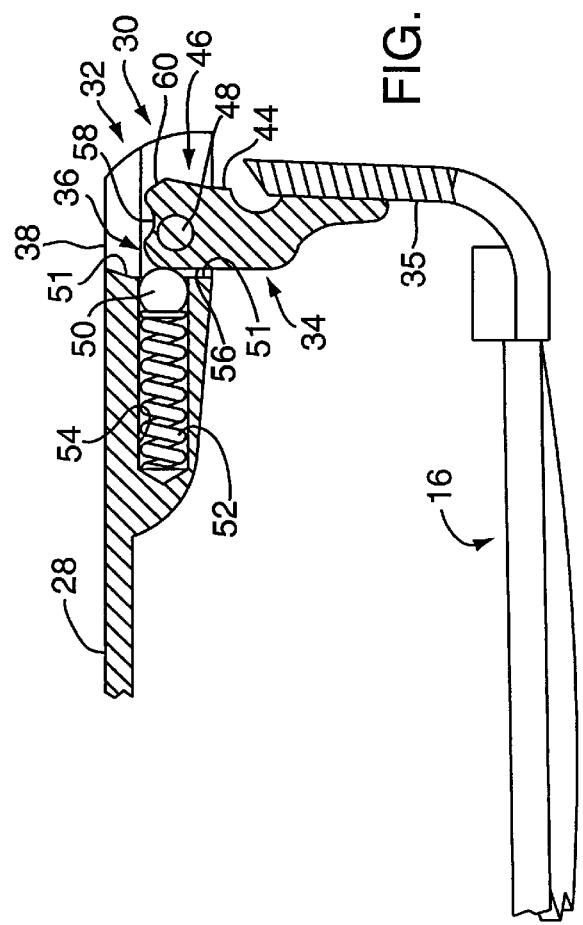
FIG. 2 is an enlarged, partial, cross-sectional view of the eyeglass assembly of FIG. 1 showing the right eyeglass hinge configured to place the respective earpiece in a closed position.

Turning now to FIGS. 2–4, the hinge 30 includes a first hinge portion 32 attached to the earpiece 28, and a second hinge portion 34 attached to the frame portion 16. Alternatively, the first hinge portion 32 may be attached to the frame portion 16, and the second hinge portion 34 attached to the earpiece 28. The second hinge portion 34 may be offset from a side arm 35 of the frame portion 16 as shown in FIGS. 1–4, or may be provided coaxially or integrally with the side arm 35 of the frame portion 16 as shown in a second embodiment of the invention described below with reference to FIGS. 5–7. As best shown in FIG. 3A, the first hinge portion 32 defines a first outwardly facing surface 36. The first hinge portion 32 includes at least one arm portion, such as first and second arm portions 38, 40 extending outwardly beyond the first outwardly facing surface 36, and spaced relative to each other to define a recess 42 therebetween.

As also shown in FIGS. 2–4, the second hinge portion 34 includes an end portion 44 defining a second outwardly facing surface 46 which is a generally three-sided cam surface. The second outwardly facing surface 46 defines first, second and third cam surface portions 56, 58, and 60 respectively, wherein each of the cam surface portions is oriented in a direction transverse to an adjacent cam surface portion. As shown best in FIGS. 3 and 3A, the end portion 44 of the second hinge portion 34 is received within the recess 42 and is pivotally coupled to the first and second arm portions 38, 40 by a pivot member 48, such as a screw, pin or other suitable connector. Although the embodiment shown in FIGS. 1–4 includes two arm portions 38 and 40, only one arm portion may be provided and coupled to the end portion 44 to permit the earpiece 28 to pivot relative to the frame portion 16. The first outwardly facing surface 36 of the first hinge portion 32 is defined by the outwardly facing surface of a bearing member 50, and by an outwardly facing surface 51 of the first hinge portion 32 flanking the bearing member 50. The bearing member 50, such as a ball bearing, is urged against the second outwardly facing surface 46 of the second hinge portion 34 by a biasing member 52, such as a compressed coil spring. The coil spring or like biasing member 52 is received within a cavity 54 formed in the first hinge portion 32, in order to bias or urge the first outwardly facing surface 36 of the ball bearing and the first hinge portion 32 against the second outwardly facing surface 46 of the second hinge portion 34 to thereby cause the two hinge portions to frictionally engage each other, and in turn create a smooth and substantially uniform drag between the two hinge portions as the earpiece 28 is moved relative to the frame portion 16.

As shown in FIGS. 2–4, the first and second outwardly facing surfaces 36, 46 are contoured relative to each other to permit the ball bearing 50 defining part of the first outwardly facing surface 36 to frictionally engage and slide or roll over the first cam surface portion 56, the second cam surface portion 58, and the third cam surface portion 60, such that the earpiece 28 is pivotable within an arc of approximately 180° about a pivot axis A—A defined by a longitudinal axis of the pivot member 48. The three cam surface portions 56, 58 and 60 provide three stable positions whereby the ball bearing 50 engages each respective cam surface portion. As best shown in FIG. 3, the second or middle cam surface portion 58 is concave in order to more securely receive the ball bearing 50, and thus hold the earpiece 28 in an ear-engaging position relative to the frame portion 16.

As shown in FIG. 2, the hinge 30 is shown where the ball bearing 50 forming part of the first outwardly facing surface 36 is urged against and frictionally engages the second outwardly facing surface 46 at the first cam surface portion 56, and which corresponds to a first stable or folded position where the earpiece 28 is folded toward the lens frame 12. The earpiece 28 is movable relative to the lens frame 12 from a folded position (FIG. 2) to an ear-engaging position (FIG. 3) by gripping the earpiece 28 and pivoting the earpiece about the pivot axis A—A, whereby the ball bearing 50 frictionally slides or rolls over the second outwardly facing surface 46 from the first cam surface portion 56 to the second cam surface portion 58. Then, the earpiece 28 can be further moved beyond an ear-engaging position (FIG. 3) to an "overextended" or spread position (FIGS. 1 and 4) by gripping the earpiece 28 and pivoting the earpiece about the pivot axis A—A such that the ball bearing 50 frictionally slides or rolls over the second outwardly facing surface 46 from the second cam surface portion 58 to the third cam surface portion 60. In each of the three positions, the outwardly facing surface of the ball bearing 50 frictionally engages the respective cam surface portions 56, 58 and 60 to thereby hold the earpiece 28 in the respective position until moved again by a user.

Provision of a spread position for the eyeglass assembly 10 shown in FIGS. 1 and 4 thus generally prevents damage to the hinge or earpieces when subject to typical stress or abuse such as, for example, overextending the hinge components when placing the eyeglasses on and off a user's head, or overflexing the earpieces when grabbed by an infant.

Turning now to FIGS. 5–7, an eyeglass assembly in accordance with a second embodiment of the present invention is generally designated by the reference number 100. The left-hand side and right-hand side of the eyeglass assembly 100 are mirror images of one another. Therefore, the further description and operation of the eyeglass assembly 100 will be shown and explained with reference to the left-hand side only, but is understood to cover the mirror image structure and operation of the right-hand side of the eyeglass assembly 100.

As shown in FIGS. 5–7, the eyeglass assembly 100 comprises a frame portion 102 and an earpiece 104 coupled to one another by a hinge 106. The hinge includes a first hinge portion 108 coupled to the earpiece 104, and a second hinge portion 110 coupled to the frame portion 102. Alternatively, the first hinge portion 108 may be coupled to the frame portion 102, and the second hinge portion 110 coupled to the earpiece 104. As can be seen in FIGS. 5–7, the second hinge portion 110 is provided coaxially with a side arm 103 of the frame portion 102, but may also be offset from the frame portion as described above with reference to the previous embodiment of FIGS. 1–4.

The first hinge portion 108 defines a generally planar, first outwardly facing surface 112. As best shown in FIG. 6A, the first hinge portion 108 also defines first and second arm portions 114, 116 extending outwardly beyond the first outwardly facing surface 112, and are spaced from one another to define a recess 118 between the arm portions 114, 116. The second hinge portion 110 includes an end portion 120 defining a second outwardly facing surface 122. The second outwardly facing surface 122 of the second hinge portion 110 is generally three-sided so as to define first, second and third generally planar surface portions 138, 140 and 142 respectively, wherein each of the planar surface portions is oriented in a direction transverse to an adjacent surface portion. As best shown in FIGS. 6 and 6A, the end portion 120 of the second hinge portion 110 is received within the recess 118 and is pivotally connected to the first and second arm portions 114, 116 by a pivot member 124, such as a screw, pin or other suitable connector. Although the embodiment shown in FIGS. 5–7 includes two arm portions 114 and 116, only one arm portion may be provided and coupled to the end portion 120 to permit the earpiece 104 to pivot relative to the frame portion 102.

The first outwardly facing surface 112 of the first hinge portion 108 is defined, in part, by an outwardly facing surface of a biased member, such as an elongated member 126 having an outwardly facing surface at one end portion 130. The biased member 126 is urged against the second outwardly facing surface 122 of the second hinge portion 110 by a biasing member 132, such as a compressed coil spring. The coil spring or like biasing member 132 is received within a cavity 134 formed in the first hinge portion 108 in order to bias or urge the first outwardly facing surface 112 of the biased member 126 and the first hinge portion 108 against the second outwardly facing surface 122 of the second hinge portion 110 to thereby cause the two hinge portions to frictionally engage each other, and in turn create a smooth and substantially uniform drag between the two hinge portions as the earpiece 104 is moved relative to the frame portion 102. A second end portion 136 of the biased member 126 may be received within the coil spring 132, as shown in FIGS. 5–7, to stabilize the biased member 126 within the cavity 134.

As shown in FIGS. 5–7, each of the planar surface portions 138, 140 and 142 is frictionally engageable with the opposing planar surface of the first outwardly facing surface 112 to permit the biased member 126 defining the first outwardly facing surface 112 to frictionally engage and slide over the first planar surface portion 138, the second planar surface portion 140, and the third planar surface portion 142, such that the earpiece 104 is pivotable within an arc of approximately 180° about a pivot axis B—B defined by a longitudinal axis of the pivot member 124. The three planar surface portions 138, 140 and 142 provide three stable positions whereby the biased member 126 engages each respective planar surface portion.

As shown in FIG. 5, the hinge 106 is shown where the biased member 126 forming the first outwardly facing surface 112 is urged against and frictionally engages the second outwardly facing surface 122 at the first planar surface portion 138, and which corresponds to a first stable or folded position where the earpiece 104 is folded toward the lens frame 102. The earpiece 104 is movable relative to the frame portion 102 from a folded position (FIG. 5) to an ear-engaging position (FIGS. 6 and 6A) by gripping the earpiece 104 and pivoting the earpiece about the pivot axis B—B, whereby the planar surface of the biased member 126, forming the first outwardly facing surface 112, frictionally slides over the second outwardly facing surface 122 from the first planar surface portion 138 to the second planar surface portion 140. Then, the earpiece 104 can be further moved from an ear-engaging position (FIGS. 6 and 6A) to an "overextended" or spread position (FIG. 7) by gripping the earpiece 104 and pivoting the earpiece about the pivot axis B—B such that the planar surface of the biased member 126 frictionally slides over the second outwardly facing surface 122 from the second planar surface portion 140 to the third planar surface portion 142. In each of the three positions, the outwardly facing surface of the biased member 126 frictionally engages the respective planar surface portion 138, 140 and 142 to thereby hold the earpiece 104 in the respective position until moved again by a user. The spread position shown in the present and previous embodiment thus prevents or minimizes damage to the hinge components or earpieces that may result from overextending the earpieces beyond the ear-engaging position, thus increasing the durability and operating life of the eyeglass assembly.

As will be recognized by those of ordinary skill in the pertinent art, numerous modifications and substitutions may be made to the above-described and other embodiments of the present invention without departing from the scope of the invention as set forth in the appended claims. Accordingly, the preceding portion of this specification is to be taken in an illustrative, as opposed to a limiting sense.

What is claimed is:

1. An eyeglass assembly comprising:
    a lens frame;
    a pair of earpieces;
    a pair of first hinge portions, each extending from one of the lens frame and a respective earpiece, each first hinge portion defining a first outwardly facing surface and an arm portion extending outwardly beyond the respective first outwardly facing surface; and
    a pair of second hinge portions, each extending from the other of the lens frame and a respective earpiece, each second hinge portion including an end portion defining a second outwardly facing surface, the end portion of the second hinge portion being coupled to the arm portion of the respective first hinge portion about a pivot axis extending through the arm portion and end portion, and the first and second outwardly facing surfaces being contoured for frictionally and slidably engaging one another to permit pivoting of each earpiece relative to the lens frame within an arc of approximately 180° about the pivot axis from a folded position to a spread position where free ends of the earpieces are substantially facing away from one another.

2. An eyeglass assembly as defined in claim 1, wherein each first hinge portion includes an additional arm portion spaced from the other arm portion and defining a recess between the arm portions, and the end portion of the second hinge portion is received in the recess and pivotally coupled to the arm portions about a pivot axis extending through the arm portions and the end portion.

3. An eyeglass assembly as defined in claim 1, wherein one of the first and second hinge portions defines a cavity, and further including a biasing member received within the cavity, and a biased member defining one of the first and second outwardly facing surfaces, the biased member being urged by the biasing member against the other outwardly facing surface.

4. An eyeglass assembly as defined in claim 3, wherein the first hinge portion defines the cavity receiving the biasing member.

5. An eyeglass assembly as defined in claim 3, wherein the other outwardly facing surface is generally three-sided so as to define three surface portions, each surface portion being oriented in a direction transverse to an adjacent surface portion, and associated with one of three stable positions for engaging the biased member such that a respective earpiece is pivotally movable to three stable eyeglass positions including a folded position, an ear-engaging position and a spread position.

6. An eyeglass assembly as defined in claim 5, wherein each of the three surface portions forms a generally planar surface.

7. An eyeglass assembly as defined in claim 6, wherein the biasing member includes a compressed spring, and the biased member includes a generally planar surface defining the one of the first and second outwardly facing surfaces to engage one of the three surface portions of the other of the outwardly facing surfaces.

8. An eyeglass assembly as defined in claim 5, wherein at least one of the three surface portions forms a cam surface portion.

9. An eyeglass assembly as defined in claim 8, wherein the biasing member includes a compressed spring, and the biased member includes a spherical member defining the one of the first and second outwardly facing surfaces to engage one of the three surface portions of the other of the outwardly facing surfaces.

10. An eyeglass assembly comprising:

a lens frame;

a pair of earpieces; and a pair of hinge assemblies, each hinge assembly pivotally connecting a respective earpiece to the frame, and including a first hinge portion mounted to the respective earpiece, a second hinge portion mounted to the frame, and means for frictionally and slidably engaging the first hinge portion to the second hinge portion and pivoting the first hinge portion relative to the second hinge portion through an arc of approximately 180° to thereby move the earpieces between a folded position to a spread position where the free ends of the earpieces are substantially facing away from each other.

11. An eyeglass assembly as defined in claim 10, wherein the means includes a means for biasing the contact surfaces against each other.

12. An eyeglass assembly comprising:

a lens frame;

a pair of earpieces;

a pair of first hinge portions, each extending from one of the lens frame and a respective earpiece, each first hinge portion defining a first outwardly facing surface and an arm portion extending outwardly beyond the respective first outwardly facing surface; and a pair of second hinge portions, each extending from the other of the lens frame and a respective earpiece, each second hinge portion including an end portion defining a second outwardly facing surface, the end portion of the second hinge portion being coupled to the arm portion of the respective first hinge portion about a pivot axis extending through the arm portion and end portion, and the first and second outwardly facing surfaces being contoured for frictionally and slidably engaging one another to permit pivoting of each earpiece relative to the lens frame within an arc of approximately 180° about the pivot axis among three stable positions including a folded position, an ear-engaging position and a spread position.

13. An eyeglass assembly as defined in claim 12, wherein one of the first and second hinge portions defines a cavity, and further including a biasing member received within the cavity, and a biased member defining one of the first and second outwardly facing surfaces, the biased member being urged by the biasing member against the other outwardly facing surface.

14. An eyeglass assembly as defined in claim 13, wherein the other outwardly facing surface is generally three-sided so as to define three surface portions, each surface portion being oriented in a direction transverse to an adjacent surface portion, and associated with one of three stable positions for engaging the biased member such that a respective earpiece is pivotally movable to the three stable positions.

15. An eyeglass assembly as defined in claim 14, wherein each of the three surface portions forms a generally planar surface.

16. An eyeglass assembly as defined in claim 15, wherein the biasing member includes a compressed spring, and the biased member includes a generally planar surface defining the one of the first and second outwardly facing surfaces to engage one of the three surface portions of the other of the outwardly facing surfaces.

17. An eyeglass assembly as defined in claim 14, wherein at least one of the three surface portions forms a cam surface portion.

18. An eyeglass assembly as defined in claim 17, wherein the biasing member includes a compressed spring, and the biased member includes a spherical member defining the one of the first and second outwardly facing surfaces to engage one of the three surface portions of the other of the outwardly facing surfaces.

* * * * *

UNITED STATES PATENT AND TRADEMARK OFFICE
CERTIFICATE OF CORRECTION

PATENT NO. : 6,068,375
DATED : May 30, 2000
INVENTOR(S) : Joseph R. LeBrun et al.

It is certified that error appears in the above-identified patent and that said Letters Patent is hereby corrected as shown below:

Title page, item [54] and col. 1, should read --

FLEXIBLE EYEGLASS ASSEMBLY --

Signed and Sealed this

Twenty-seventh Day of February, 2001

*Attest:*

NICHOLAS P. GODICI

*Attesting Officer*   *Acting Director of the United States Patent and Trademark Office*